United States Patent
Maeda et al.

[11] Patent Number: 5,806,480
[45] Date of Patent: Sep. 15, 1998

[54] AIR INTAKE SYSTEM

[75] Inventors: Ituro Maeda; Joji Kasugai, both of Ichinomiya, Japan

[73] Assignee: Toyoda Gosei Co., Inc., Aichi-ken, Japan

[21] Appl. No.: 922,753

[22] Filed: Sep. 3, 1997

[30] Foreign Application Priority Data

Sep. 4, 1996 [JP] Japan .................................. 8-255593

[51] Int. Cl.⁶ .................................................. F02M 35/10
[52] U.S. Cl. .................................................. 123/184.57
[58] Field of Search ................ 123/184.21, 184.53, 123/184.57

[56] References Cited

U.S. PATENT DOCUMENTS

| | | | |
|---|---|---|---|
| 4,538,556 | 9/1985 | Takeda | 123/184.57 |
| 4,889,081 | 12/1989 | Ozaki | 123/184.53 |
| 4,938,177 | 7/1990 | Hasegawa | 123/184.35 |
| 5,002,021 | 3/1991 | Nakata et al. | 123/184.42 |
| 5,307,767 | 5/1994 | Schutz | 123/184.57 |
| 5,495,834 | 3/1996 | Rutschmann et al. | 123/184.31 |
| 5,572,966 | 11/1996 | Doddy et al. | 123/184.57 |

FOREIGN PATENT DOCUMENTS

53-30660  3/1978  Japan.

*Primary Examiner*—David A. Okonsky
*Attorney, Agent, or Firm*—Cushman Darby & Cushman, IP Group of Pillsbury Madison & Sutro, LLP

[57] ABSTRACT

An air intake system for an internal combustion engine comprises an air pipe having at least one communication aperture in a pipe wall and opposite ends, and a resonator formed substantially coaxially about and spaced from an outer circumference of the air pipe and disposed substantially over the entire length of the air pipe. The resonator is connected at the opposite ends to the air pipe. The air intake system further comprises a flexible inner bellows formed at a portion of the air pipe and a flexible outer bellows formed at a portion of the resonator substantially overlying the inner bellows. The material for molding the resonator is changed at an intermediate portion in a longitudinal direction of the resonator from a hard resin to a soft resin, with at least the outer bellows being formed from a soft resin.

14 Claims, 9 Drawing Sheets

FIG. 9
PRIOR ART de" extending through a 5,806,480

AIR INTAKE SYSTEM

The priority application, Japanese Patent Application No. 8-255593, filed in Japan on Sep. 4, 1996, is hereby incorporated into the present specification by reference.

BACKGROUND OF THE INVENTION

1. Field of the Invention

The present invention relates to an air pipe used, for example, for an air cleaner hose, air cleaner duct or air intake pipe that constitutes an air intake system of an internal combustion engine.

2. Description of the Related Art

Figure 9:
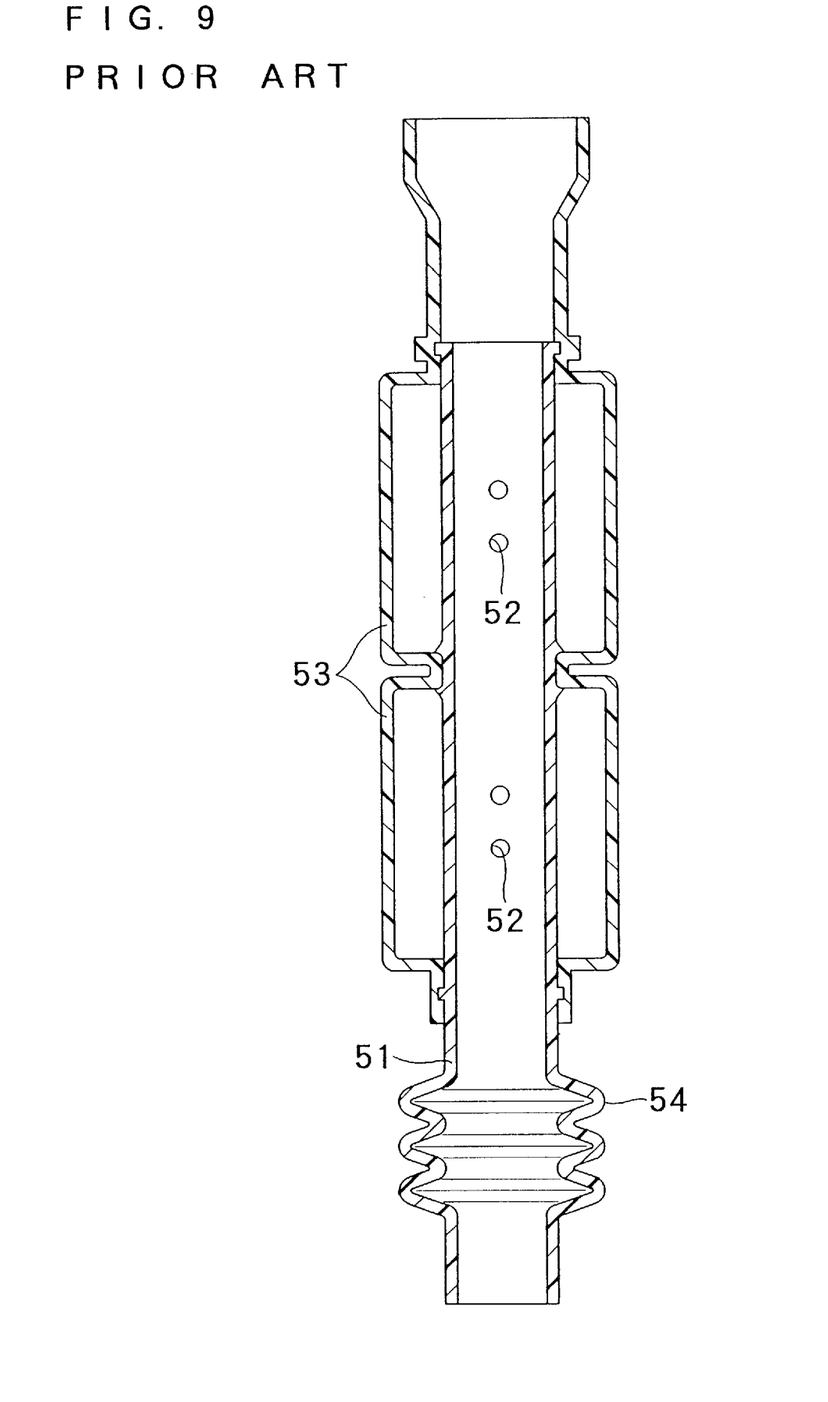
FIG. 9 is a cross sectional view illustrating a conventional air passage pipe.

In an air intake system of an internal combustion engine for use in an automobile, a resonator is often provided for reducing intake noise. For example, Japanese Patent Application Laid-Open Specification No. 53-30660 discloses an example, as shown in FIG. 9, comprising an air passage pipe 51 having communication apertures 52 perforated in a pipe wall and a resonator 53 formed by blow molding substantially coaxially at a space to the outer circumference of the air passage pipe 51 to a portion surrounding the communication apertures 52 and tightened and welded at both ends and at an intermediate portion to the outer circumferential surface of the air passage pipe 51. In this conventional example, since the inside of the resonator 53 acts as an adiabatic space, radiation heat from an internal combustion engine and a hot blow from a radiator can be shielded from transmission to intake air in the air passage pipe 51.

Flexible bellows 54 are often formed to a portion of the air passage pipe 51 to facilitate attachment to the internal combustion engine and improve vibration absorption. In this case, the resonator 53 is formed somewhat shorter in order not to interfere with the bellows 54 and deteriorate the flexibility of the bellows 54. This, however, results in a problem that the heat shielding effect is eliminated at the bellows 54.

SUMMARY OF THE INVENTION

It is accordingly, an object of the present invention to provide an air intake system for an internal combustion engine capable of providing both an effect of obtaining a heat shielding performance of a resonator to the utmost degree by disposing the resonator substantially coaxially over the entire surface of the air pipe and an effect of facilitating attachment to the internal combustion engine and improving the vibration absorption by adapting such that the flexibility of bellows formed to a part of the air pipe is not deteriorated.

For attaining the foregoing object, the air intake system for the internal combustion engine of the present invention comprises an air pipe having at least one communication aperture in a pipe wall and opposite ends, a resonator formed substantially coaxially about and spaced from an outer circumference of the air pipe and disposed substantially over the entire length of the air pipe, the resonator being connected at the opposite ends to the air pipe, a flexible inner bellows formed at a portion of the air pipe, and a flexible outer bellows formed at a portion of the resonator substantially overlying the inner bellows, the material for molding the resonator being changed at an intermediate portion in a longitudinal direction of the resonator from a hard resin to a soft resin, with at least the outer bellows being formed from a soft resin.

As the "air pipe", for example, an air cleaner hose, an air cleaner duct and an air intake pipe can be used. There is no particular restriction for the material of the air pipe. For example, synthetic resins such as polypropylene and thermoplastic elastomers (TPE) and rubbers such as chloroprene rubber can be used. Furthermore, there is no particular restriction also on the method of molding the air pipe. For example, injection molding, blow molding and extrusion molding can be used.

When the air pipe is formed by blow molding, the material for molding the air pipe is changed at an intermediate portion in a longitudinal direction of the air pipe from a hard resin to a soft resin, with at least the inner bellows are preferably formed from a soft resin. "Communication aperture" includes both a hole extending through the pipe wall (accordingly, the length of the hole is equal to the thickness of the pipe wall) and a cylinder of a predetermined length disposed in the pipe wall, with no particular restriction to the shape, number and the position of disposing them.

"Resonator" has no particular restriction on the shape and the size. There is no particular restriction on the type of the hard resin and the soft resin used as the material for molding the resonator, for which polypropylene or TPE can be used.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

A description will now be made of an air cleaner hose to be used as an air pipe interconnecting an air cleaner and a fuel injection device (both not shown) of an automobile internal combustion engine embodying the invention with reference to the drawings.

Figure 1:
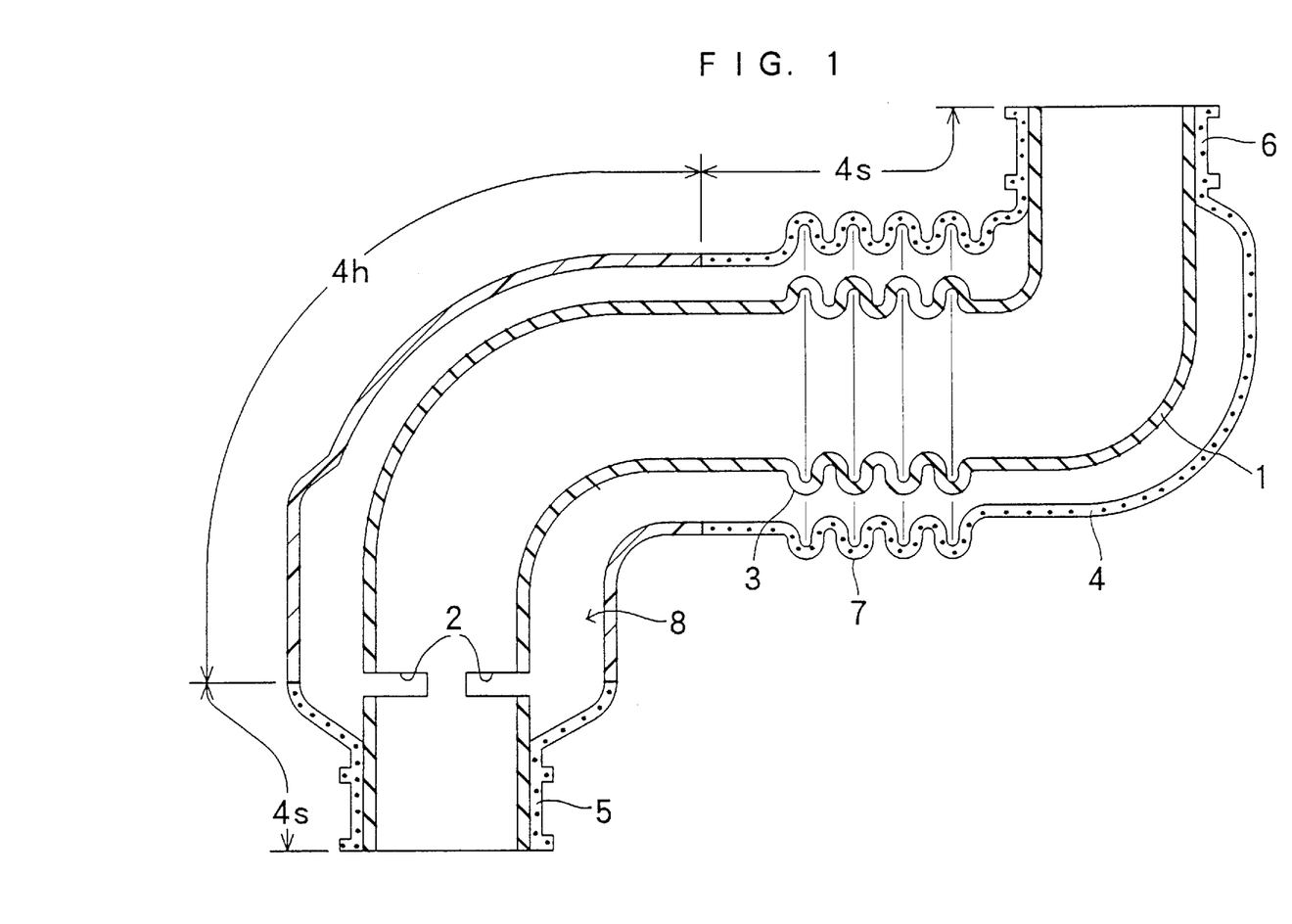
FIG. 1 is a cross sectional view illustrating an air cleaner hose according to a first embodiment of the present invention.

At first, FIGS. 1–5 show a first embodiment. An air cleaner hose 1 shown in FIG. 1 is injection molded with chloroprene rubber, which is bent in a crank-shape at two right and left intermediate portions. Slit-like communication apertures 2, divided into two portions in a circumferential direction, are provided at a straight portion near the left end of the air cleaner hose 1. Flexible inner bellows 3 are formed at a portion in a longitudinal direction of the air cleaner hose, that is, along a central straight portion near the bent portion at the right.

A resonator 4 is attached substantially coaxially about and spaced from the outer circumference over a substantial portion of the entire length of the air cleaner hose 1. The size of the gap of the spaced resonator 4 is made larger at that portion of the resonator 4 surrounding the communication apertures 2. The resonator 4 is formed into a tubular shape by blow molding, and tightened and welded at a left end 5 and a right end 6 to the outer circumferential surface on both ends of the air cleaner hose 1. Flexible outer bellows 7 are formed at a portion in a longitudinal direction of the resonator 4 and at the outer circumferential position for the inner bellows 3.

Furthermore, the material for molding the resonator 4 is changed at an intermediate portion in a longitudinal direction from a hard TPE 4h to a soft TPE 4s. Specifically, in FIG. 1, the left end 5 and a portion from the right end 6 to the outer bellows 7 which are indicated by dotted areas are made of the soft TPE 4s, while the remaining portions which are indicated by the hatched area are made of the hard TPE 4h. Indication of the drawing is changed for clarifying the difference in the hard resin and the soft resin, and the dotted area does not indicate that the material is foamed. Furthermore, for making the portion of material change clearer, it is illustrated at the boundary between the hard TPE 4h and the soft TPE 4s as if the composition of the wall changed abruptly from 0:100 to 100:0. However, the actual composition of the wall is usually changed gradually over a predetermined overlap range.

The air cleaner hose 1 with the resonator 4 is manufactured by way of the following steps.

[Hose forming step]

The air cleaner hose 1 is injection molded and the communication apertures 2 and the inner bellows 3 are formed during molding.

[Die setting step]

Figure 2:
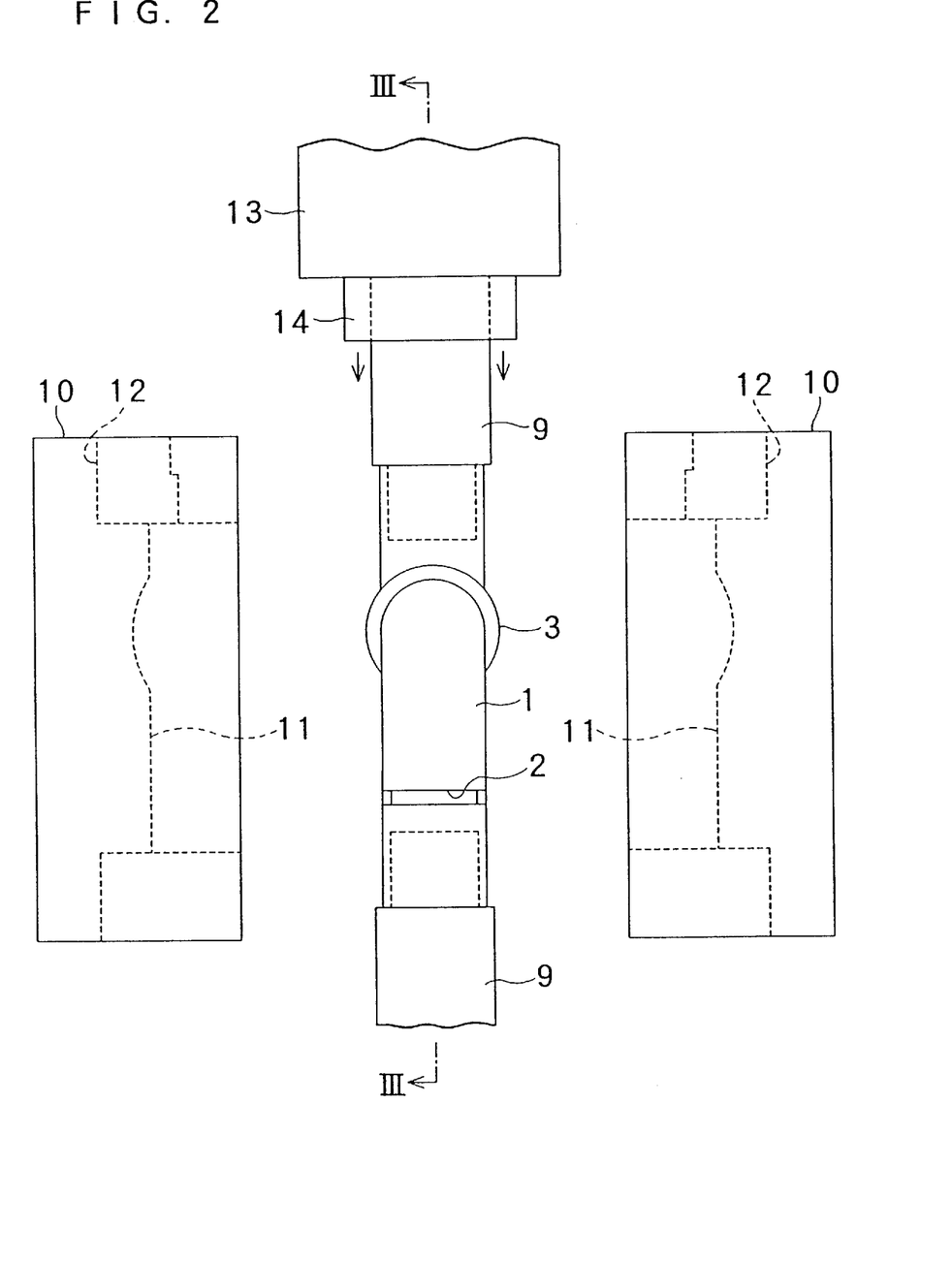
FIG. 2 is a front view illustrating a die setting step for the air cleaner hose.
Figure 3:
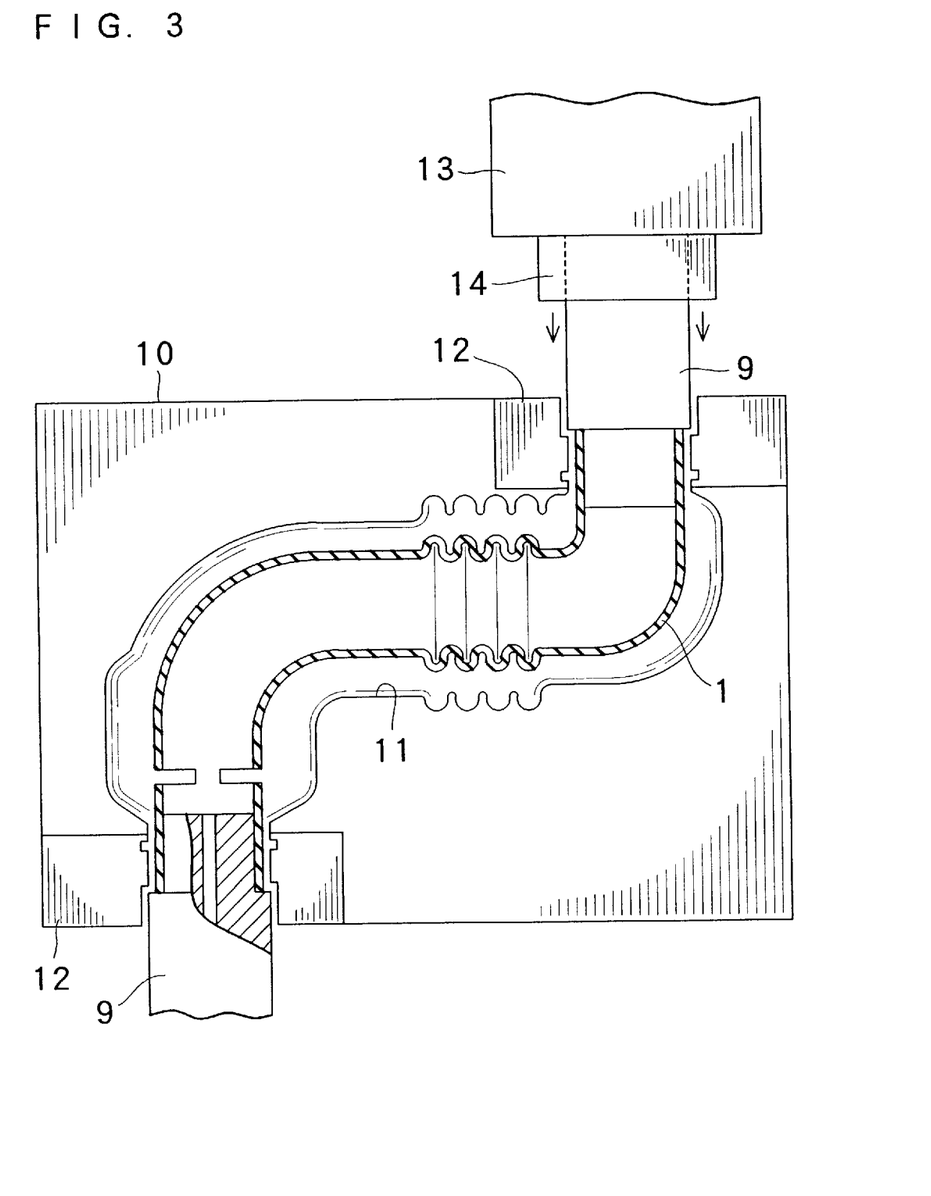
FIG. 3 is a vertical cross sectional view taken along line III—III in FIG. 2.

As shown in FIGS. 2 and 3, plug members 9 are inserted to both ends of the air cleaner hose 1 to support the air cleaner hose 1 between opened blow split dies 10,10. Each of blow split dies 10,10 has a concave molding surface 11 and slide dies 12 on both right and left ends, and can be laterally opened and closed.

[Parison extrusion step]

As shown in FIGS. 2 and 3 to FIGS. 4 and 5, a cylindrical parison 14 is extruded from a cross head 13 of an extruder situated above to the outer circumference over the entire length of the air cleaner hose 1 while changing the soft TPE 4s and the hard TPE 4h at an intermediate stage. Since the air cleaner hose 1 is bent into a crank shape, the extruded parison 14 is positioned skillfully to the outer circumference of the air cleaner hose 1 while being bent by manual operation or automatic operation of air blowing or the like.

[Die closing step]

Figure 4:
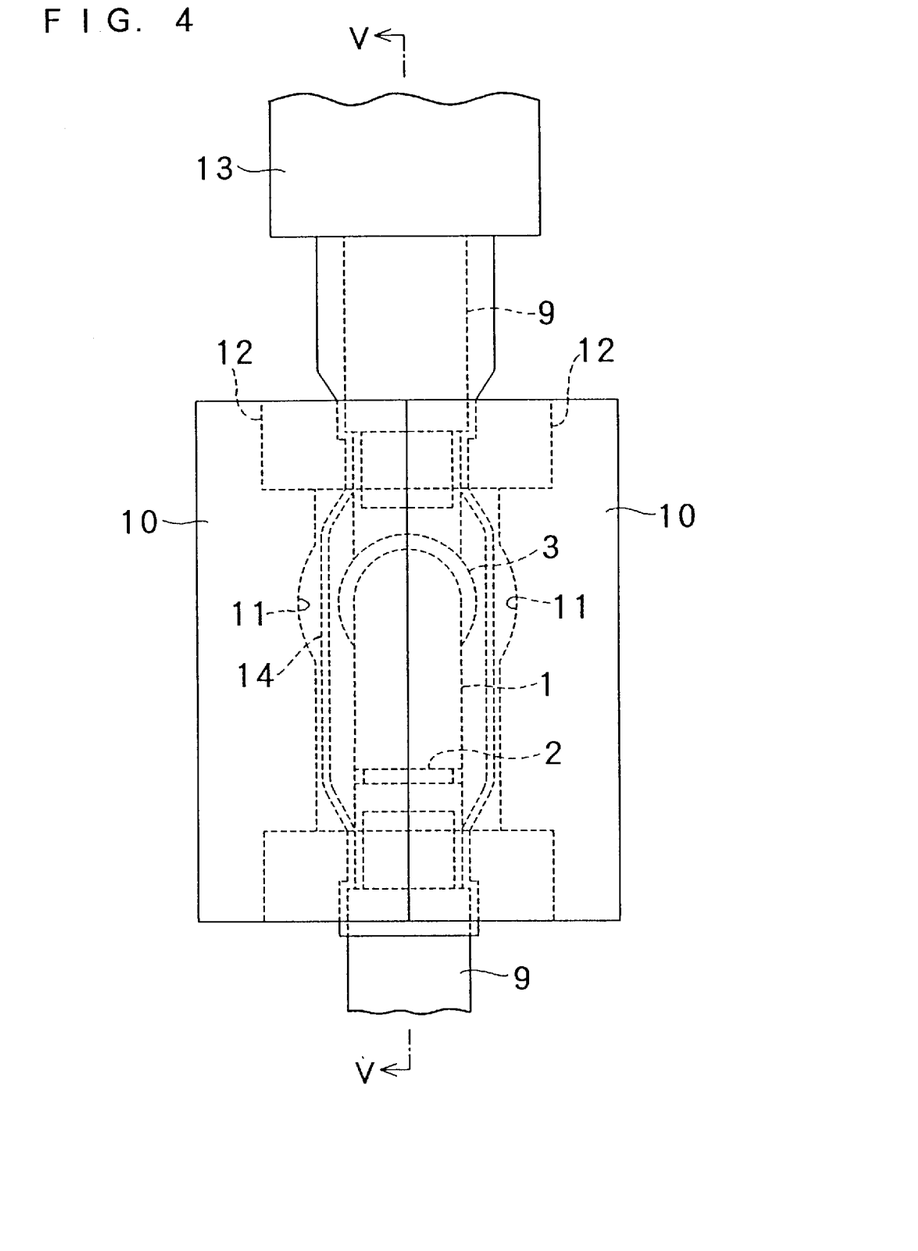
FIG. 4 is a front view illustrating a die closing step for the air cleaner hose.
Figure 5:
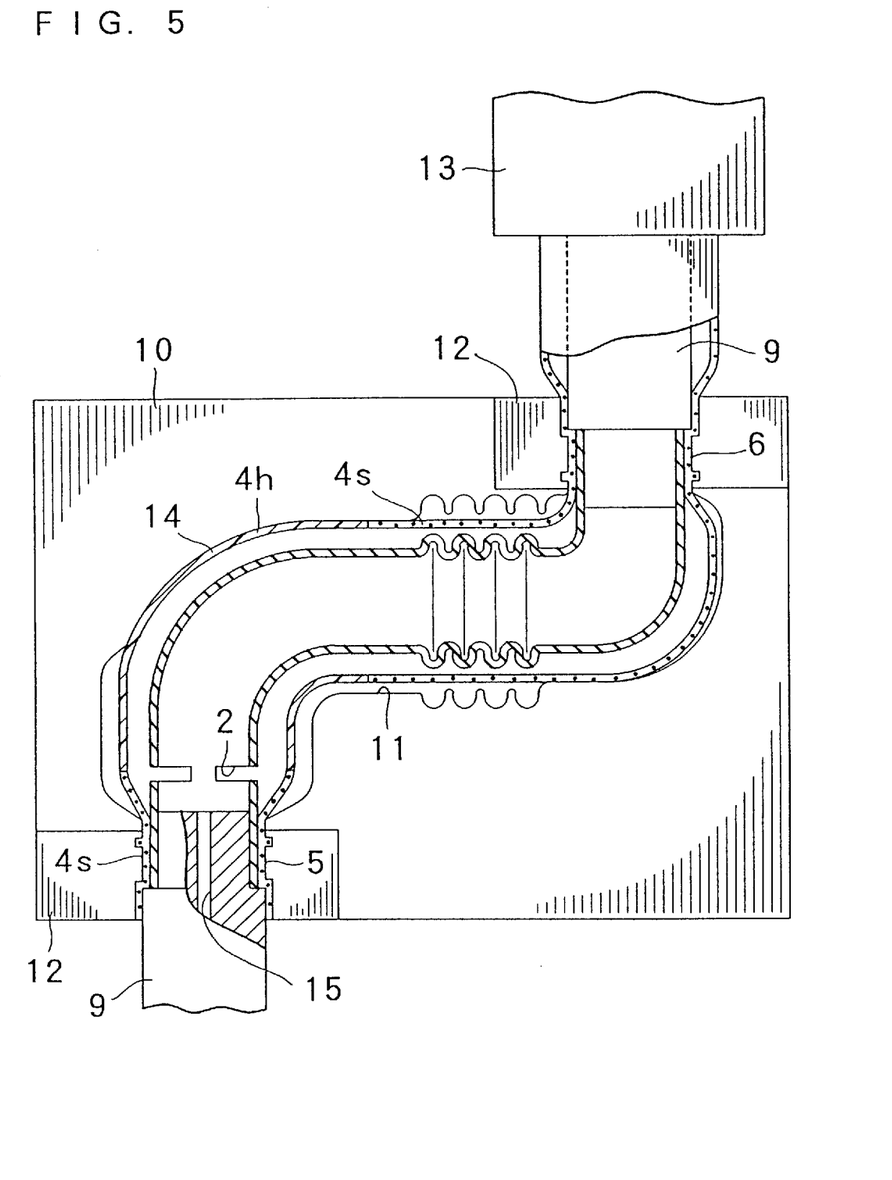
FIG. 5 is a vertical cross sectional view taken along line V—V in FIG. 4.

As shown in FIGS. 4 and 5, two remote portions of the parison 14 (corresponding to the left end 5 and the right end 6) are diametrically reduced by the slide dies 12, 12 of the blow split dies 10,10 and circumferentially tightened to the outer circumferential surface of the air cleaner hose 1, and at the same time, welded by the heat from the parison 14. Then, the blow split dies 10,10 are closed to confine the parison 14 to the inside of the concave molding surface 11.

[Air blowing step]

Air is blown into the parison 14 through an air communication channel 15 formed to the lower plug member 9 and the communication apertures 2 of the air cleaner hose 1 thereby expanding and urging the parison 14 to the concave molding surface 11 (not illustrated) to form the resonator 4 as shown in FIG. 1.

[Deburring cutting step]

After cooling and curing the parison 14, the blow split dies 10,10 are opened to release the air cleaner hose 1 from the die, and burrs on both ends of the parison 14 are cut out.

The air cleaner hose 1 having the resonator 4 constituted as described above provides the following functions and effects.

(1) Since the inner space of the resonator 4 functions as a resonant cavity 8 in communication with the air cleaner hose 1 by way of the communication apertures 2, air intake noise can be reduced.

(2) Since the resonator 4 is disposed substantially coaxially to the outer circumference of the air cleaner hose 1, the entire portion can be made compact to effectively utilize the space in the engine room or compartment.

(3) Since the resonator 4 extends over the entire length of the air cleaner hose 1 and, accordingly, the resonant cavity 8 extends substantially over the entire length of the air cleaner hose 1, the resonant cavity 8 functions as a heat insulation space. Radiation heat from the internal combustion engine or hot blow from the radiator can be shielded to the utmost degree from the intake air in the air cleaner hose 1, and thus elevation of the temperature of the intake air can be prevented to thereby improve the power performance of the internal combustion engine.

(4) The resonator 4 is formed so as to also surround also the inner bellows 3, and the flexible outer bellows 7 are formed to the outer circumferential position of the inner bellows 3 and the outer bellows 7 can be deformed easily due to the soft TPE 4s, so that flexibility of the inner bellows 3 is scarcely reduced, and the air cleaner hose 1 has both good performance attachment and vibration absorption.

Figure 6:
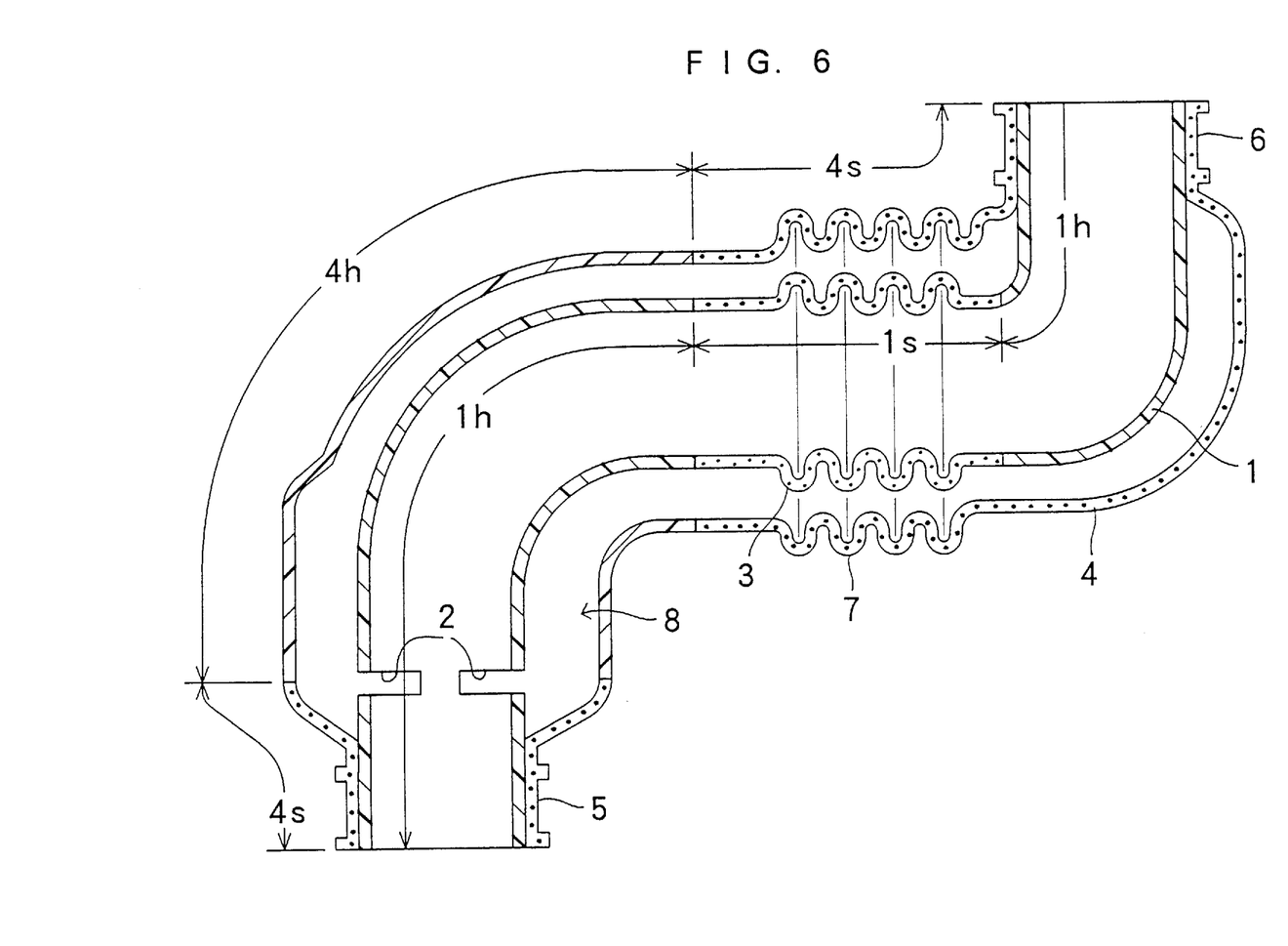
FIG. 6 is a cross sectional view illustrating an air cleaner hose according to a second embodiment of the present invention.

Then, a second embodiment shown in FIG. 6 is different from the first embodiment only in that the air cleaner hose 1 is blow molded while changing the molding material at an intermediate portion in a longitudinal direction, the inner bellows 3 are made of soft TPE 1s while the remaining portions are made of hard TPE 1h, and can provide the same effects as those in the first embodiment.

The present invention is not restricted to only the embodiments described above, but may be embodied by appropriate modifications within a range not departing from the gist of the present invention, for example, as below.

(1) The length and the number of waves of the inner bellows 3 and the outer bellows 7 are changed.

Figure 7:
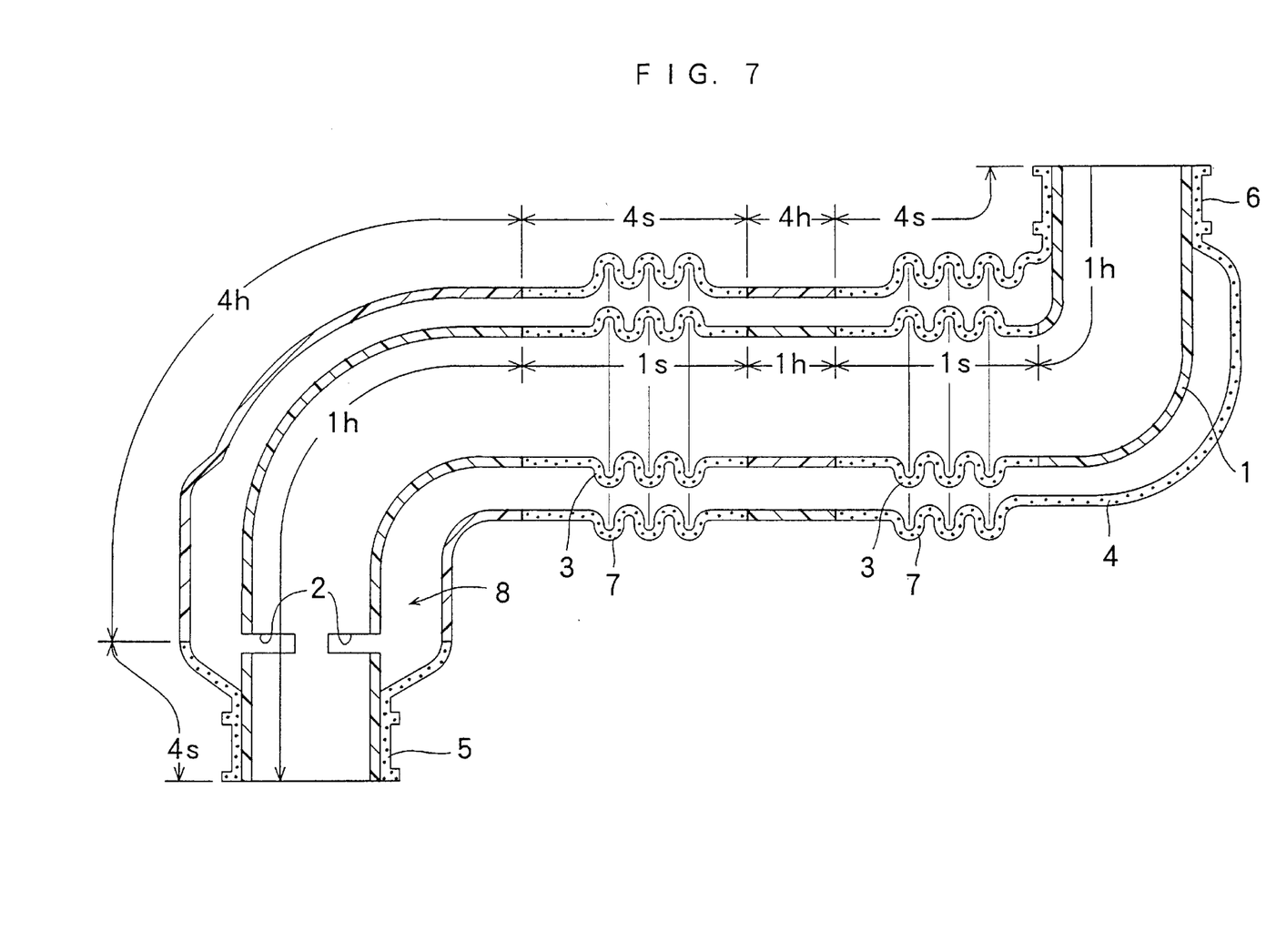
FIG. 7 is a cross sectional view illustrating a modified example of the embodiment in which inner bellows and outer bellows are formed at two positions.

(2) As shown in FIG. 7, the inner bellows 3 and the outer bellows 8 are formed at two or more positions in a longitudinal direction of the air cleaner hose 1 and the resonator 4.

(3) Since the left end 5 and the right end 6 are tightened by clamp members when they are assembled to mating components of the internal combustion engine, they are not necessarily joined by welding or the like to the air cleaner hose 1 but may be merely tightened to the outer circumferential surface of the air cleaner hose 1.

(4) The present invention is applicable to various types of air pipes such as an air cleaner duct or an air intake pipe in addition to the air cleaner hose.

Figure 8:
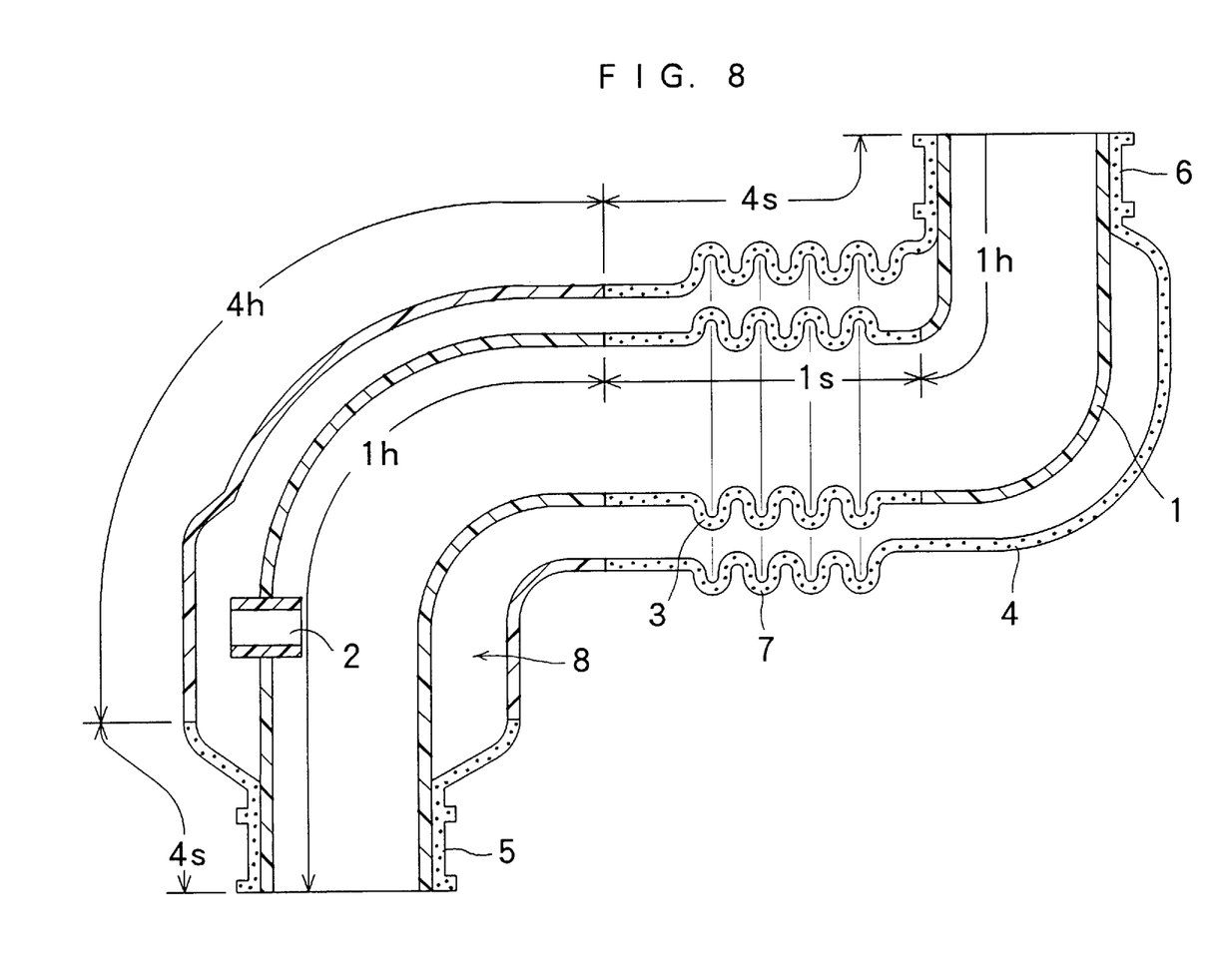
FIG. 8 is a cross sectional view illustrating a modified example of the embodiment in which a communication aperture is formed as a cylinder disposed in the pipe wall.

(5) The communication aperture 2 may be made as a cylinder disposed to an air cleaner hose 1 as shown in FIG. 8.

As many apparently widely different embodiments of this invention may be made without departing from the spirit and scope thereof, it is to be understood that the invention is not limited to the specific embodiments thereof except as defined in the appended claims.

What is claimed is:

1. An air intake system for an internal combustion engine comprising:

an air pipe having at least one communication aperture in a pipe wall and opposite ends;

a resonator formed substantially coaxially about and spaced from an outer circumference of said air pipe and disposed substantially over the entire length of said air pipe, said resonator being connected at said opposite ends to said air pipe;

a flexible inner bellows formed at a portion of said air pipe; and a flexible outer bellows formed at a portion of said resonator substantially overlying said inner bellows, the material for molding said resonator being changed at an intermediate portion in a longitudinal direction of said resonator from a hard resin to a soft resin, with at least said outer bellows being formed from a soft resin.

2. An air intake system for an internal combustion engine as set forth in claim 1, wherein said air pipe is an air cleaner hose.

3. An air intake system for an internal combustion engine as set forth in claim 1, wherein said air pipe is an air cleaner duct.

4. An air intake system for an internal combustion engine as set forth in claim 1, wherein said air pipe is an air intake pipe.

5. An air intake system for an internal combustion engine as set forth in claim 1, wherein said air pipe is formed by injection molding.

6. An air intake system for an internal combustion engine as set forth in claim 1, wherein said air pipe is formed by extrusion molding.

7. An air intake system for an internal combustion engine as set forth in claim 1, wherein said air pipe is formed by blow molding.

8. An air intake system for an internal combustion engine as set forth in claim 7, wherein the material for molding said air pipe is changed at an intermediate portion in a longitudinal direction of said air pipe from a hard resin to a soft resin, with at least said inner bellows being formed from a soft resin.

9. An air intake system for an internal combustion engine as set forth in claim 1, wherein said at least one communication aperture is a hole extending through said pipe wall.

10. An air intake system for an internal combustion engine as set forth in claim 1, wherein said at least one communication aperture comprises a cylinder disposed in said pipe wall.

11. An air intake system for an internal combustion engine as set forth in claim 1, wherein the hard resin and the soft resin used as the molding material for said resonator are made of polypropylene.

12. An air intake system for an internal combustion engine as set forth in claim 1, wherein the hard resin and the soft resin used as the molding material for said resonator are made of a thermoplastic elastomer.

13. An air intake system for an internal combustion engine as set forth in claim 1, wherein each of said inner bellows and said outer bellows is formed at a portion in a longitudinal direction of said air pipe and said resonator, respectively.

14. An air intake system for an internal combustion engine as set forth in claim 1, wherein each of said inner bellows and said outer bellows is formed at at least two portions in a longitudinal direction of said air pipe and said resonator, respectively.

\* \* \* \* \*